United States Patent [19]
Ishimoto

[11] Patent Number: 5,602,337
[45] Date of Patent: Feb. 11, 1997

[54] ABNORMAL SOUND DETECTING APPARATUS

[75] Inventor: Susumu Ishimoto, Higashimurayama, Japan

[73] Assignee: Auto Konig, Tokyo, Japan

[21] Appl. No.: 56,493

[22] Filed: May 3, 1993

[30] Foreign Application Priority Data

May 14, 1992 [JP] Japan .................... 4-120910

[51] Int. Cl.⁶ .................................. G01H 11/06
[52] U.S. Cl. ................................. 73/658; 73/649
[58] Field of Search ................. 73/587, 613, 625, 73/641, 649, 654, 658

[56] References Cited

U.S. PATENT DOCUMENTS

| | | | |
|---|---|---|---|
| 3,365,935 | 1/1968 | Kane | 73/658 |
| 4,583,405 | 4/1986 | Simmons | 73/584 |
| 4,991,439 | 2/1991 | Betts | 73/587 |
| 5,041,989 | 8/1991 | Kataoka et al. | 73/587 |

*Primary Examiner*—Richard Chilcot
*Assistant Examiner*—Max H. Noori
*Attorney, Agent, or Firm*—Bauer & Schaffer

[57] ABSTRACT

An abnormal sound detecting apparatus is disclosed which has an acoustoelectric conversion element for converting an acoustic pressure into an electrical signal, two amplifiers for amplifying the electrical signal from the acoustoelectric conversion element, two volume controllers provided at the input sides of the two amplifiers and for controlling the electrical signal from the acoustoelectric conversion element, a change-over switch for changeably supplying the electrical signal from the acoustoelectric conversion element to the two amplifiers through the two volume controllers, respectively, and a stereophonic head phone for receiving the output signals from the two amplifiers to convert the same to sound.

9 Claims, 4 Drawing Sheets

ABNORMAL SOUND DETECTING APPARATUS

BACKGROUND OF THE INVENTION

1. Field of the Invention

The present invention relates generally to sound or abnormal sound detecting apparatus, and is directed more particularly to a sound or abnormal sound detecting apparatus suitable for detecting or inspecting a sound or especially abnormal sound emitted from, for example, the inside of a motorcar (automobile), which is moving, or whose engine is starting, its engine, injector, bearing or the like and the air flow of an air conditioner or the like.

2. Description of the Prior Art

In the prior art, in order to detect a sound, especially abnormal sound emitted from a motorcar, for example, there is employed such a detecting device which utilizes the principle of a stethoscope. At present, since the mechanism of a motorcar becomes complicated, it is very difficult that the above detecting device using the principle of the stethoscope detects or finds a sound or an abnormal sound and hence its source in the motorcar whose engine is starting.

Further, this conventional detecting device using the principle of the stethoscope can not detect or inspect an abnormal sound which is most likely generated in a moving motorcar such as an abnormal sound emitted from the suspension parts of the moving motorcar, its transmission mechanism, its differential gears or its other rotating parts and so on.

In the prior art, when the above abnormal sound is detected or inspected, it is necessary that, for example, a mechanic enters the trunk of a motorcar or rides on the back seat or assistant's seat of the motorcar to hear the abnormal sound and then find its source depending on his perception and experiences while repeating the running test of the motorcar. Therefore, this inspection and detection of the abnormal sound and its source require much time and skillfulness.

OBJECTS AND SUMMARY OF THE INVENTION

Accordingly, it is an object the present invention to provide an abnormal sound detecting apparatus which is free from the disadvantages encountered in the prior art.

It is another object of the present invention to provide an abnormal sound detecting apparatus which can detect an abnormal sound and then find its source efficiently and accurately in a short period of time.

According to an aspect of the present invention, there is provided an abnormal sound detecting apparatus which comprises:

a) an acoustoelectric conversion means for converting an acoustic pressure into an electrical signal;

b) two amplifier means for amplifying the electrical signal from said acoustoelectric conversion means;

c) two volume controller means provided at input sides of said two amplifier means and for controlling the electrical signal from said acoustoelectric conversion means;

d) a change-over switch means for changeably supplying the electrical signal from said acoustoelectric conversion means to said two amplifier means through said two volume controller means, respectively; and e) a stereophonic head phone for receiving output signals from said two amplifier means to convert the same to sound.

According to another aspect of the present invention, there is provided an abnormal sound detecting apparatus which comprises:

a) at least two acoustoelectric conversion means, each converting an acoustic pressure into an electrical signal;

b) two amplifier means for amplifying the electrical signals from said acoustoelectric conversion means;

c) two volume controller means provided at input sides of said two amplifier means and for controlling the electrical signals from said acoustoelectric conversion means;

d) a change-over switch means for changeably supplying the electrical signals from said acoustoelectric conversion means to said two amplifier means through said two volume controller means, respectively; and e) a stereophonic head phone for receiving output signals from said two amplifier means to convert the same to sounds, respectively.

According to a third aspect of the present invention, there is provided an abnormal sound detecting apparatus which comprises:

a) an acoustoelectric conversion means for converting an acoustic pressure into an electrical signal;

b) two amplifier means for amplifying the electrical signal from said acoustoelectric conversion means;

c) two volume controller means provided at input sides of said two amplifier means and for controlling the electrical signal from said acoustoelectric conversion means;

d) a change-over switch means for changeably supplying the electrical signal from said acoustoelectric conversion means to said two amplifier means through said two volume controller means, respectively; and e) a sound level meter for receiving output signals from said two amplifier means to display the same thereon in response to their levels.

According to a fourth aspect of the present invention, there is provided an abnormal sound detecting apparatus which comprises:

a) at least two acoustoelectric conversion means, each converting an acoustic pressure into an electrical signal;

b) two amplifier means for amplifying the electrical signals from said acoustoelectric conversion means;

c) two volume controller means provided at input sides of said two amplifier means and for controlling the electrical signals from said acoustoelectric conversion means;

d) a change-over switch means for changeably supplying the electrical signals from said acoustoelectric conversion means to said two amplifier means through said two volume controller means, respectively; and e) a sound level meter for receiving output signals from said two amplifier means to display the same thereon in response to their levels.

The above and other objects, features, and advantages of the present invention will become apparent from the following detailed description of an illustrative embodiment there of to be read in conjunction with the accompanying drawings through which like reference numeral designate the like elements.

DESCRIPTION OF THE PREFERRED EMBODIMENTS

The present invention will be now described with reference to the drawings attached.

Figure 1:
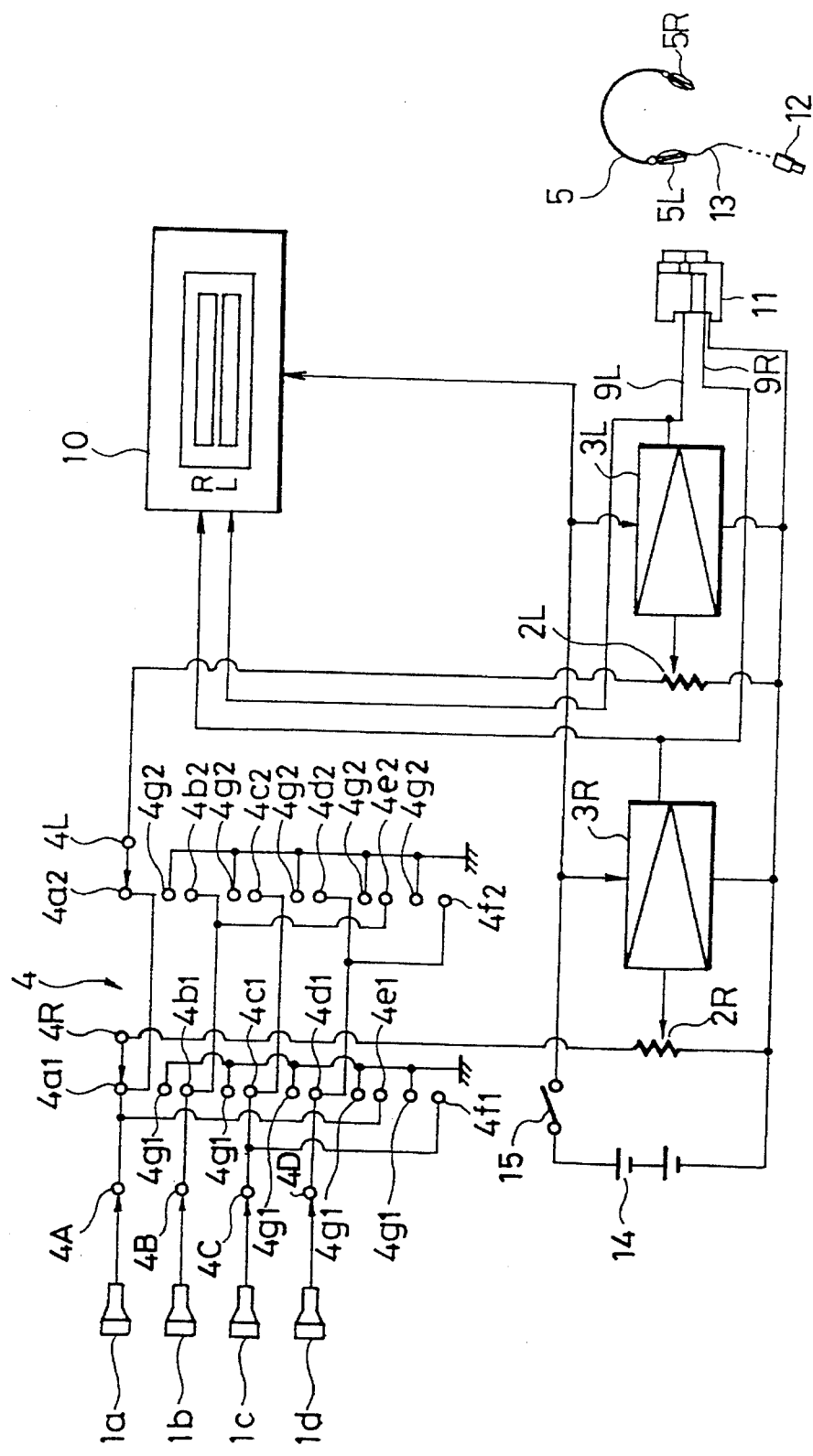
FIG. 1 is a connection diagram showing an embodiment of the abnormal sound detecting apparatus according to the present invention.

FIG. 1 is a connection diagram showing an embodiment of the abnormal sound detecting apparatus according to the present invention. In this embodiment, for example, four acoustoelectric conversion elements (hereinafter referred to as vibration sensors) $1a$, $1b$, $1c$ and $1d$ are employed. Each of the vibration sensors $1a$ to $1d$ serves to convert a sound (acoustic pressure) into an electrical (voltage) signal and is made of, for example, a piezoelectric element. That is, each of the vibration sensors $1a$ to $1d$ produces an electrical signal whose frequency corresponds to the frequency of vibration or sound picked up by each of the vibration sensors.

As shown in FIG. 1, in this embodiment an output electrical signal from the vibration sensor $1a$ is supplied through a lead wire to first one and first other fixed contacts $4a1$ and $4a2$ and to a fifth one fixed contact $4e1$ of a change-over switch 4; an output electrical signal from the vibration sensor $1b$ is supplied through a lead wire to second one and second other fixed contacts $4b1$ and $4b2$ and to a fifth other fixed contact $4e2$ of the change-over switch 4; an output electrical signal from the vibration sensor $1c$ is supplied through a lead wire to third one and third other fixed contacts $4c1$ and $4c2$ and to a sixth one fixed contact $4f1$ of the change-over switch 4; and an output electrical signal from the vibration sensor $1d$ is supplied through a lead wire to fourth one and fourth other fixed contacts $4d1$ and $4d2$ and to a sixth other fixed contact $4f2$ of the change-over switch 4, respectively.

The change-over switch 4 has one movable contact 4R which is changeably and successively connected to the one fixed contact $4a1$, $4b1$, $4c1$, $4d1$, $4e1$ and $4f1$ and, also has the other movable contact 4L which is changeably and successively connected to other fixed contacts $4a2$, $4b2$, $4c2$, $4d2$, $4e2$ and $4f2$. In this embodiment, the one and the other movable contacts 4R and 4L of the change-over switch 4 are manually switched over in a ganged relation.

In this change-over switch 4, there are respectively provided ground contacts $4g1$ for grounding the one movable contact 4R between adjacent one fixed contacts, that is, between first and second one fixed contacts $4a1$ and $4b1$; second and third one fixed contacts $4b1$ and $4c1$; third and fourth one fixed contacts $4c1$ and $4d1$; fourth and fifth one fixed contacts $4d1$ and $4e1$; and fifth and sixth one fixed contacts $4e1$ and $4f1$, respectively, and the five ground fixed contact $4g1$ are connected in common to the ground. Further, in the change-over switch 4, there are respectively provided other ground fixed contacts $4g2$ for grounding the other movable contact 4L between adjacent other fixed contacts, that is, between first and second other fixed contacts $4a2$ and $4b2$; second and third other fixed contacts $4b2$ and $4c2$; third and fourth other fixed contacts $4c2$ and $4d2$; fourth and fifth other fixed contacts $4d2$ and $4e2$; and fifth and sixth other fixed contacts $4e2$ and $4f2$, respectively, and the five ground fixed contacts $4g2$ are connected in common to the ground.

The output or detected signals obtained at the one and the other movable contacts 4R and 4L of the change-over switch 4 are supplied through one and other volume controllers 2R and 2L to one and other sound signal amplifiers 3R and 3L, respectively.

The output signals from the one and other sound signal amplifiers 3R and 3L are respectively supplied to one and other output terminals 9R and 9L and also to a sound level meter 10. To the output terminal 9R and 9L, there is coupled a jack 11. A stereophonic head phone 5 has one and other or right and left head phones 5R and 5L to which a plug 12 is connected through a lead wire 13 led out from the head phones 5R and 5L. The plug 12 is inserted into the jack 11 when the apparatus is used in practice. The sound level meter 10 has one and other level displays R and L, each being made of, for example, a number of photo diodes arranged in bar-shape to which the output signals from the sound signal amplifiers 3R and 3L are supplied, respectively.

In the embodiment shown in FIG. 1, there is provided a power supply source, for example, battery 14 to apply an electric power through a power supply switch 15 to the sound signal amplifiers 3R and 3L and to the sound level meter 10 and so on.

Next, the operation of the embodiment shown in FIG. 1 according to the present invention will be explained.

Figure 7:
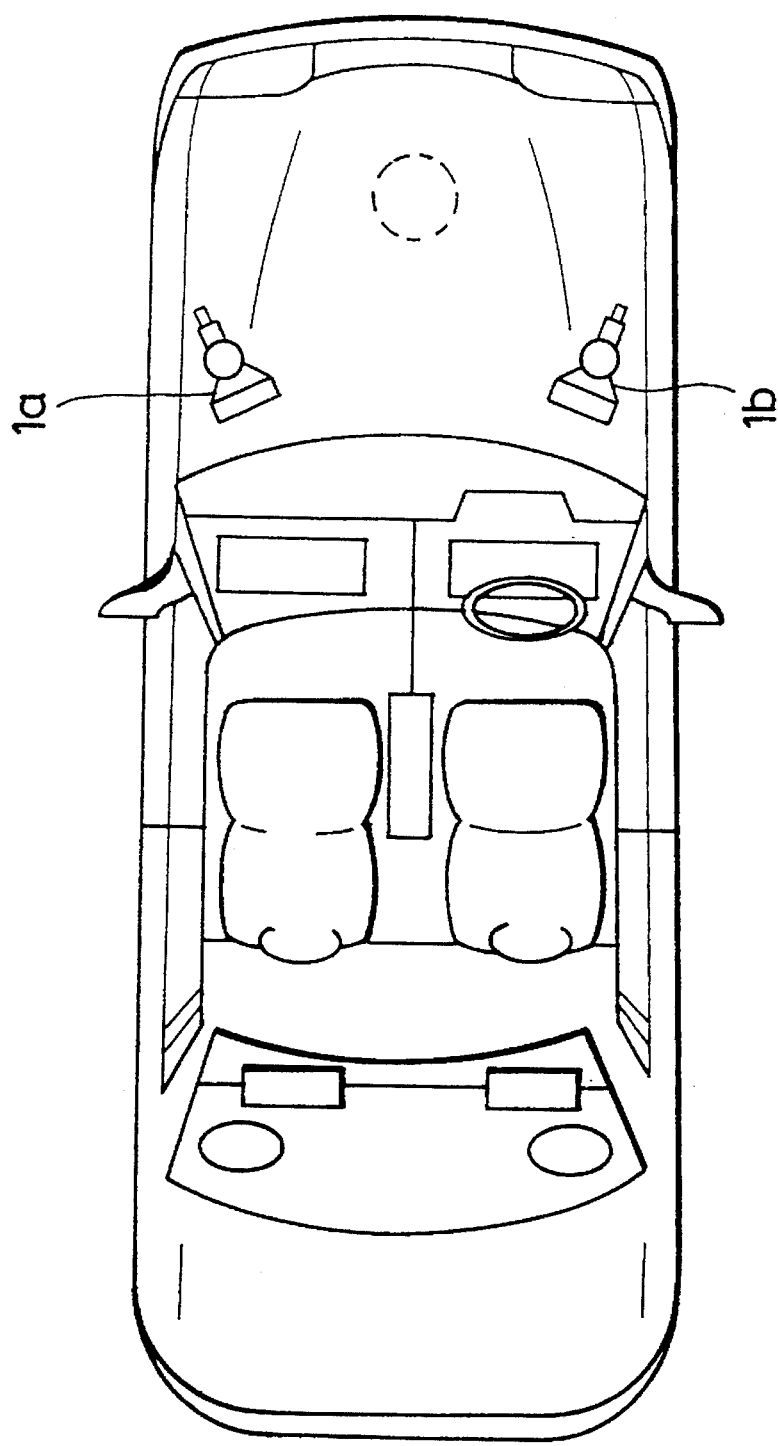
FIG. 7 is a schematic diagram used to explain the present invention.

First, the vibration sensors $1a$, $1b$, $1c$ and $1d$ are respectively attached to portions, for example, a bonnet of a motorcar or the like which means that sound or abnormal sound emitted from the engine or the like of the motorcar, for example, is desired to be detected or inspected (see FIG. 7).

Then, the power supply switch 15 is turned on, and the head phones 5R and 5L of the stereophonic head phone 5 are respectively connected to the output terminals 9R and 9L or jack 11 through the plug 12.

Then, if the change-over switch 4 is manually operated, for example, in such a manner that its one and other movable contacts 4R and 4L are successively connected to the first to fourth one and other fixed contacts $4a1$ to $4d1$ and $4a2$ to $4d2$, the same sounds can be successively heard from the one and other head phones 5R and 5L of the stereophonic head phone 5. That is, the sounds emitted from the engine or the like through the bonnet to which the vibration sensors $1a$ to $1d$ are attached, respectively, can be successively and separately heard, and hence whether the engine or the like is normal or abnormal can be inspected or judged successively and separately.

In this case, since the output signals from the sound signal amplifiers 3R and 3L are also supplied to the sound level meter 10 or its level displays R and L, respectively, the sound level meter 10, namely its level displays R and L respectively indicate the same levels thereon successively and independently corresponding to the sounds generated at the portions to which the vibration sensors 1a to 1d are attached, respectively. Therefore, the same effect as that in the case of using the stereophonic head phone 5 can be made in a visual manner by watching the sound level meter 10.

Also, when the change-over switch 4 is manually switched such that its movable contacts 4R and 4L are connected at the same time to the fifth one and other fixed contacts 4e1 and 4e2, respectively, then the detected sound by the vibration sensor 1a can be heard from the one head phone 5R, while at the same the detected sound by the vibration sensor 1b can be heard from the other head phone 5L. Therefore, a source from which, for example, an abnormal sound is emitted can be easily detected. Further, both the sounds can be compared so that the compared result can be used to make various judgements effectively.

In this case, since the output signals from the sound signal amplifiers 3R and 3L are also supplied to the sound level meter 10 or its level displays R and L, respectively, the levels corresponding to the sounds respectively detected by the vibration sensors 1a and 1b can be separately displayed on the level displays R and L of the sound level meter 10 at the same time. Thus, the same effect as in the case of using the stereophonic head phone 5 can be effected in a visual manner by using the sound level meter 10.

Further, when the change-over switch 4 is manually switched such that its movable contacts 4R and 4L are connected at the same time to the sixth one and other fixed contacts 4f1 and 4f2, respectively, then the detected sound by the vibration sensor 1c can be heard from the one head phone 5R, while at the same the detected sound by the vibration sensor 1d can be heard from the other head phone 5L. Therefore, similar to the case mentioned just above, a source from which an abnormal sound is emitted can be easily detected. Further, both the sounds can be compared so that the compared result can be used to make various judgements effectively.

In this case, since the output signals from the sound signal amplifiers 3R and 3L are also supplied to the sound level meter 10 or its level displays R and L, respectively, the levels corresponding to the sounds respectively detected by the vibration sensors 1c and 1d can be separately displayed on the level displays R and L of the sound level meter 10 at the same time. Thus, the same effect as in the case of using the stereophonic head phone 5 can be effected in a visual manner by using the sound level meter 10.

Figure 2:
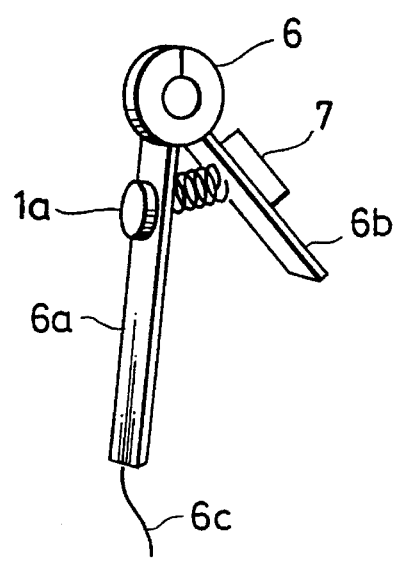
FIG. 2 is a perspective view showing an example of a vibration sensor used in the embodiment shown in FIG. 1.

FIG. 2 shows an example of an attaching device for attaching each of the vibration sensors 1a to 1d to a portion to be inspected. Although FIG. 2 shows the attaching device for only the vibration sensor 1a, this attaching device can be used, as it is, for each of the other vibration sensors 1b, 1c and 1d.

In FIG. 2, reference numeral 6 designates a clip made of such a material to transmit a sound, for example, plastics. For example, the vibration sensor 1a is fixed to one leg 6a of the clip 6 and a magnet 7 is fixed to the other leg 6b of the clip 6. The vibration sensor 1a is attached by the clip 6 or magnet 7 to a portion an abnormal sound or a sound generated at which is to be detected or inspected. In FIG. 2, reference numeral 6c designates the lead wire led out from the vibration sensor 1a.

Figure 3:
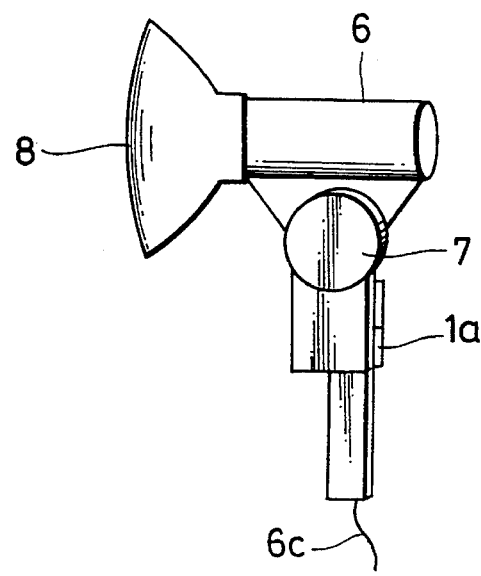
FIG. 3 and 4 are perspective view showing other examples of the vibration sensor to be used in the present invention, respectively.

FIG. 3 shows a second example of the attaching device for the vibration sensor. In this example, a sucking disk or adaptor 8 is attached to the clip 6. The second example of the attaching device is useful when the vibration sensor 1a is attached to a flat plane such as the flat surface of a glass plate or the like because the sucking disk 8 can be easily sucked to the flat plane.

Figure 4:
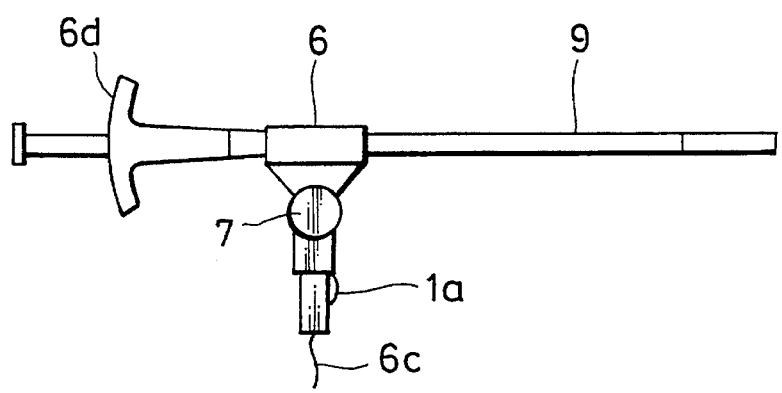

FIG. 4 shows a third embodiment of the attaching device form the vibration sensor 1a. This third embodiment comprises a test bar 9 of a small diameter which is attached to the clip 6. The test bar 9 is made of a material, which effectively transmits a sound, for example, metal, plastics or the like.

In FIG. 4, reference numeral 6d is a knob.

The third embodiment of the attaching device is useful when a narrow portion, for example, engine, relay or the like is to be inspected. That is, the test bar 9 is inserted into the narrow portion and a sound generated therein is transmitted to the vibration sensor 1a through the test bar 9 and so on.

It is also possible that a vibration sensor is directly coupled to a magnet and then the vibration sensor is attached to a portion to be inspected by means of the magnet.

It is further possible that a vibration sensor is protected by, for example, a pad and then the vibration sensor is attached to a portion, for example, spring to be inspected by a tape, for example, a magic tape or the like.

Figure 5:
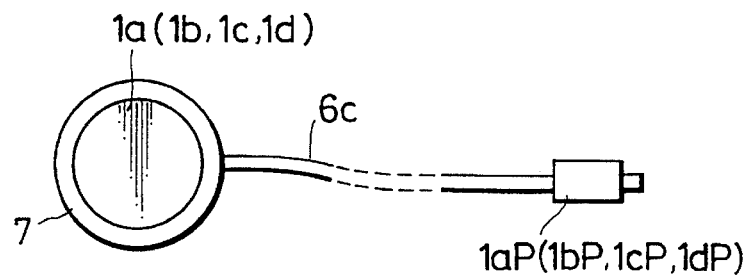
FIG. 5 is a schematic diagram used to explain the present invention.

FIG. 5 shows a practical example of each of the vibration sensors 1a to 1d. Since each of the vibration sensors 1a to 1d is substantially same in structure, only the vibration sensor 1a is described with reference to FIG. 5. In this example, the vibration sensor 1a is directly coupled to the magnet 7 by way of example.

In FIG. 5, the lead wire 6c led out from the vibration sensor 1a comprises a plug 1aP at its free end.

In FIG. 1, the vibration sensors 1a, 1b, 1c and 1d are respectively connected to input terminals 4A, 4B, 4C and 4D which are respectively led out from the one fixed contacts 4a1, 4b1, 4c1 and 4d1 of the change-over switch 4, but when the vibration sensors 1a to 1d shown in FIG. 5 are employed, the input terminals 4A to 4D are replaced with jacks 4A1, 4B1, 4C1 and 4D1, which will be described later, and the plugs 1aP, 1bP, 1cP and 1dP of the vibration sensors 1a to 1d are inserted into the jacks 4A1 to 4D1, respectively.

Figure 6:
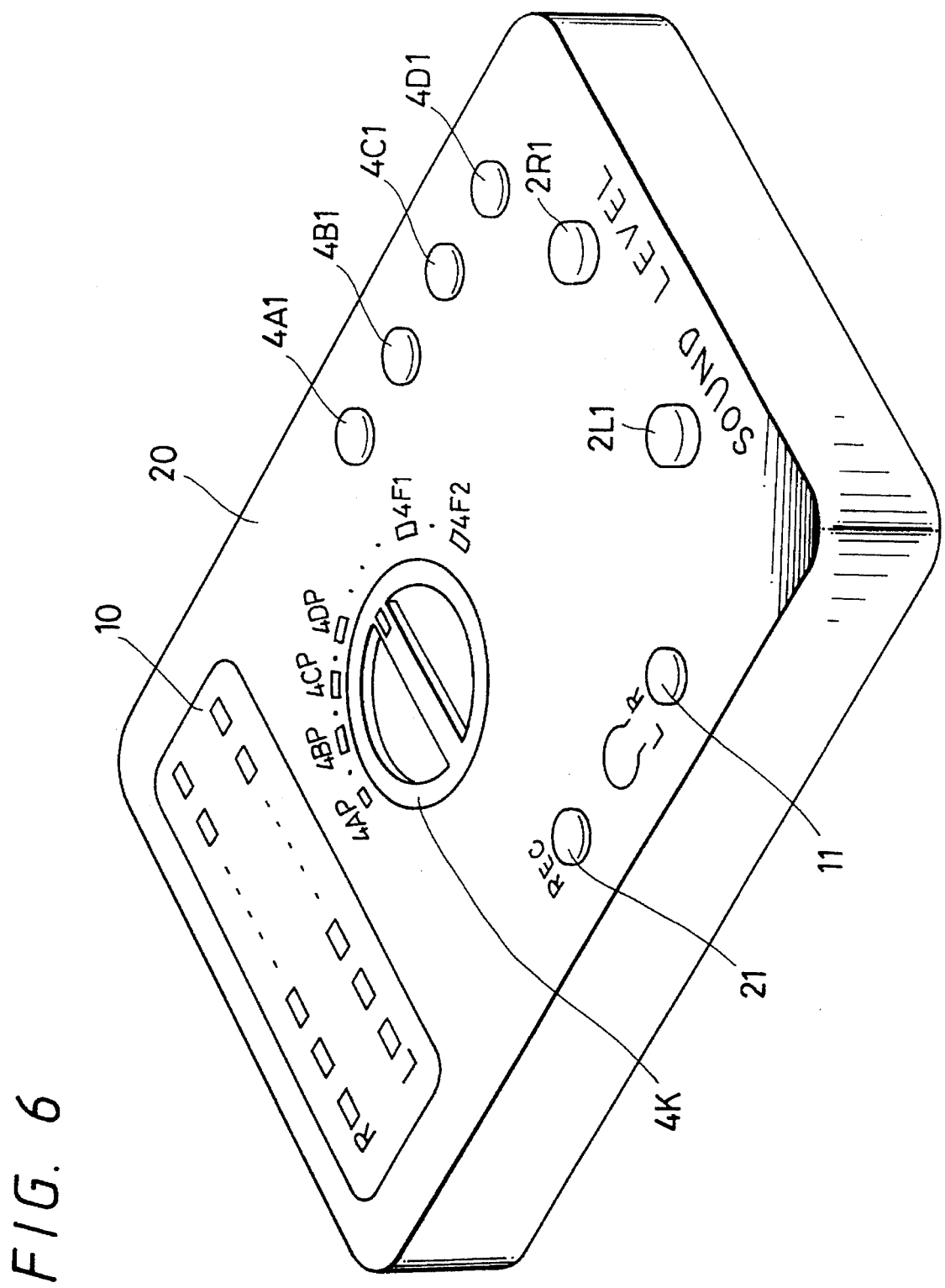
FIG. 6 is a perspective view showing a main body of the embodiment shown in FIG. 1.

FIG. 6 shows a main body of a practical example of the abnormal sound detecting apparatus according to the present invention. In FIG. 6, reference numeral 20 designates a casing made of, for example, plastics. In the casing 20, there are accommodated the parts shown in FIG. 1 except for the vibration sensors 1a to 1d and the stereophonic head phone 5.

In FIG. 6, reference numerals 4A1, 4B1, 4C1 and 4D1 denote the jacks which are respectively connected to the one fixed contacts 4a1, 4b1, 4c1 and 4d1 of the change-over switch 4 as described above. Reference numeral 2L1 and 2R1 designate knobs of the volume controllers 2L and 2R, respectively, and 4K is an operation knob of the change-over switch 4. Reference numeral 4AP, 4BP, 4CP and 4DP indicate position marks which correspond to the one fixed contacts 4a1, 4b1, 4c1 and 4d1 or 4a2, 4b2, 4c2 and 4d2, respectively.

In FIG. 6, reference numerals F1 and F2 correspond to the fixed contacts 4e1, 4e2 and 4f1, 4f2, respectively, and 21 represents a jack to which a recorder, not shown, is connected, when it is desired to record the inspection results.

As described above, according to the present invention, a sound, especially abnormal sound and its emitting source can be easily and accurately detected by a simple arrangement relatively.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An abnormal sound detecting apparatus comprising:

a) at least two acoustoelectric conversion means, each converting an acoustic pressure into an electrical signal;

b) two amplifier means for amplifying the electrical signals from said at least two acoustoelectric conversion means, respectively;

c) two volume controller means, provided at input sides of said two amplifier means, for controlling the electrical signals from said at least two acoustoelectric conversion means;

d) a change-over switch means for changeably supplying the electrical signals from said at least two acoustoelectric conversion means to said two amplifier means through said two volume controller means, respectively, and;

e) a stereophonic head phone for receiving output signals from said two amplifier means to covert the same to sounds, respectively, wherein each of said change-over switch means has at least two pair of fixed contacts, each of said pair being connected in common, at least one pair of fixed contacts which are connected to different acoustoelectric conversion means, respectively, and a pair of movable contacts, the acoustoelectric conversion means being connected respectively to one of said fixed contacts of said change-over means, and said movable contacts being changeably connected respectively to one of said pair of fixed contacts of said change-over means and to said amplifier means through said volume controller means, respectively.

2. An abnormal sound detecting apparatus comprising:

a) at least two acoustoelectric conversion means, each converting an acoustic pressure into an electrical signal;

b) two amplifier means for amplifying the electrical signals from said at least two acoustoelectric conversion means;

c) two volume controller means, provided at input sides of said two amplifier means, for controlling the electrical signals from said at least two acoustoelectric conversion means;

d) a change-over switch means for changeably supplying the electrical signals from said at least two acoustoelectric conversion means to said two amplifier means through said two volume controller means, respectively, and;

e) a sound level meter for receiving output signals from each of said two amplifier means, respectively, to display the same thereon in response to their levels, said change-over switch means having at least two pair of fixed contacts, each pair being connected in common, at least one pair of fixed contacts which are connected to different acoustoelectric conversion means, respectively, and a pair of movable contacts, said acoustoelectric conversion means being connected respectively to said pair of fixed contacts of said change-over means and to said amplifier means through said volume controller means, respectively.

3. An abnormal sound detecting apparatus according to claim 1, further comprising attaching means for attaching said acoustoelectric conversion means to a portion to be inspected.

4. An abnormal sound detecting apparatus as claimed in claim 3, wherein said attaching means is a magnet.

5. An abnormal sound detecting apparatus as claimed in claim 3, wherein said attaching means is a clip.

6. An abnormal sound detecting apparatus as claimed in claim 5, wherein said clip comprises a sucking disc.

7. An abnormal sound detecting apparatus as claimed in claim 5, wherein said clip comprises a test bar fixed thereto.

8. An abnormal sound detecting apparatus according to claim 2, wherein said acoustoelectric conversion means comprises a plug and said change-over means has a jack connected to its fixed contact, said plug being able to be inserted into said jack.

9. An abnormal sound detecting apparatus according to claim 8, further comprising a jack to which the outputs from said amplifier means are connected and said sterophonic head phone has a plug which can be inserted into said jack.

\* \* \* \* \*